United States Patent Office 3,541,626
Patented Nov. 24, 1970

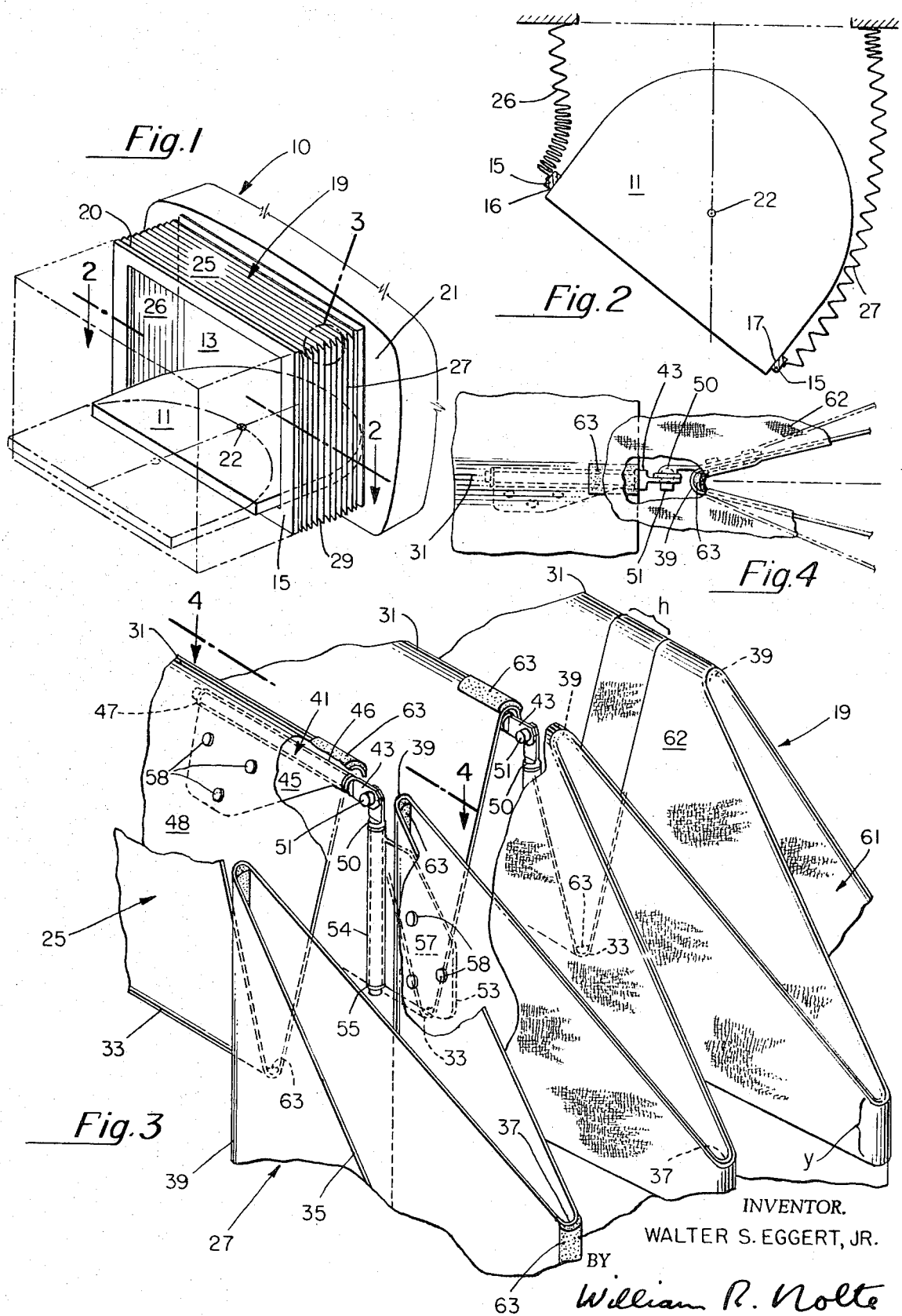

1

3,541,626
BELLOWS CONSTRUCTION
Walter S. Eggert, Jr., Huntingdon Valley, Pa., assignor to The Budd Company, Philadelphia, Pa., a corporation of Pennsylvania
Filed Aug. 14, 1969, Ser. No. 850,142
Int. Cl. B65g 11/00
U.S. Cl. 14—71                    6 Claims

ABSTRACT OF THE DISCLOSURE

Top and bottom fan fold members aligned with opposite side fan fold members are connected by hinges at their intersecting adjacent end portions. The hinges include pivoted posts each mounted for rotation about its axis along a fold line of a fan fold member. Adjacent end portions of members are connected by fabric to provide a seal against noise, wind and weather.

---

This invention has utility in the type of vehicle shown and described in Pat. 2,778,674 to inventor A. C. Attendu, entitled Airport and Transfer Buses. The vehicle described therein includes an access door opening in the front end of its body and is provided with a bellows device which is adapted to be extended or retracted relative to the front portion of the bus. The rear portion of the bellows is affixed to the front face partion of the bus. The forward portion of the bellows is connected to a door frame which is mounted for horizontal reciprocal movement by hydraulic units.

It is believed that future requirements in the loading and unloading passengers from such vehicles anticipates gangways capable of being extended through greater lengths than heretofore. In addition it is believed that gangways of this latter type will require capabilities of rotation through wider angles. These requirements are due to the greatly increased size of the vehicles serviced and because of their swept-back wing configurations. As a consequence of such increase in extension, the snow loads, wind loads and combinations thereof subject the bellows construction associated with the gangway to much greater shear and bending stresses.

Accordingly it is the principal object of this invention to provide a novel bellows construction for an aircraft transfer vehicle having improved stress bearing capabilities as well as being able to undergo wide angular movements.

In accordance with the invention, a bellows construction is provided for enclosing an extensible gangway or walkway structure for an aircraft transfer vehicle. The bellows construction includes first and second fan fold members each having inner and outer fold lines, with hinge means interconnecting the first and the second fan fold members. The hinge means include first post means aligned in parallel relation with the outer fold line of the first member, with means for mounting the same for rotation about its longitudinal axis and connected to said first member. The hinge means also include second post means pivoted to the first post means with mounting means enabling rotation about its axis and prallel with inner fold line of said second member, and being provided with means for mounting the same to said second member.

For a better understanding of the present invention, together with other and further objects thereof reference is had to the following description taken in connection with the accompanying drawings.

In the drawings, FIG. 1 is a diagrammatic view in perspective elevation of a portion of a transfer vehicle employing a bellows arrangement which is constructed in accordance with the present invention.

2

FIG. 2 is a sectional view taken along the line 2—2 of FIG. 1 and showing the bellows of the vehicle rotated with respect to that shown in FIG. 1.

FIG. 3 is a greatly enlarged view of a corner portion of the bellows as indicated by the enclosed portion as encircled at 3 of FIG. 1.

FIG. 4 is a plan view taken along the line 4—4 of FIG. 3.

Referring now to FIG. 1 of the drawing there is shown schematically the front portion of an aircraft passenger transfer vehicle 10 of the type shown in the above referred to Pat. 2,778,674. The vehicle includes a rotatable gangway 11 which may be extended and retracted relative to an access opening or doorway 13 in the vehicle. A rectangular frame 15 encircles the front portion of the walkway platform and is suitably affixed to its side surfaces as at 16, 17. A bellows construction 19 is provided to protect the passengers and walkway against rain, snow, wind, noises and weather, etc. by encircling the walkway to constitute a tunnel construction therearound. The forward end of the bellows is affixed to the rear face 20 of the frame 15 while the rear end portion of the bellows is affixed to the front face 21 of the vehicle by fastening means not shown. By extending the walkway 11 to its phantom line position illustrated in FIG. 1 the bellows 19 supported by the frame 15 is stretched accordingly. In addition, the walkway 11 may be suitably rotated about a vertical axis as indicated at 22 in FIG. 2 to thereby stretch one side portion of the bellows a greater amount than an opposite side. Due to the fact that the vehicle is designed to operate in all normal weather conditions, the bellows are subjected to various forces such as snow loads, wind loads, and combination thereof. As a consequence the bellows must be constructed in a manner to structurally carry and withstand such loads.

In accordance with the invention, and referring now to FIGS. 1 and 3, the bellows assembly 19 is shown as including a plurality of accordion, or fan fold panels, top 25, sides 26, 27, and bottom 29. The edge portions of the panels are joined in the manner as indicated in FIG. 3. More specifically top panel 25 is fan folded to include top or outer folds 31 and bottom or inner folds 33. The side panel 27 is likewise of fan fold configuration and its upper portion is truncated as at 35. The panel 27 includes outer folds 37 and inner folds 39, the height of the panel being greatest along the inner line of fold 39. It can be seen further that the inner folds 39 of side diaphragm 27 are aligned in the same vertical plane with the outer folds 31 of top panel 25.

In order to connect the top and side panels 25, 27 respectively with the folds so aligned a plurality of hinge assembly means 41 are provided. The hinge assembly includes a horizontal pin 43 aligned parallel to the axis of fold 31 of member 25. A hinge leaf member 45 includes a barrel 46 which encircles pin 43 to enable the latter to rotate about its axis relative to the fold 31. A retainer ring 47 prevents separation of the pin from the barrel 46. The hinge leaf 45 is secured to the planar material 48 of the member 25 between its folds 31, 33 by rivets 49. A second hinge pin 50 is pivoted to the outer end of hinge pin 43 by means of pivot 51. It is aligned vertically between the edges of top member 25 and spaced from the outer periphery of inner fold line 39 of side panel 27. A hinge leaf 53 having a barrel 54 enables the pin to rotate about its longitudinal axis, retainer ring 55 maintaining the pin 50 against separation from the barrel. The hinge leaf 53 includes a planar tab portion 57 which is secured to the planar portion of member 27 extending between folds 37, 39 by rivets 58.

It is noted that a series of hinge assemblies are provided at the intersections on the outer fold lines 31 of the top member 25 and the inner fold lines 39 of the side member 27. Moreover like hinge connections are made with upper opposite side member 26 with the opposite side of top member 25 from that shown in FIG. 3. In addition the bottom ends of side member 26, 27 (FIG. 1) are connected by hinge assemblies 41 to the opposite side ends of bellows member 29. By means of such hinge assemblies, corresponding spaced outer and inner folds 31. 39 of adjacent intersecting panel memebrs 25, 27 respectively are maintained in aligned relationship. The hinge assemblies however permit expansion and contraction of the diaphragm members. It can be appreciated that as a result of snow loads applied to the top diaphragm 25 for example, each top fold 31 constitutes a beam which transmits shear loads through the hinge assemblies 43 disposed at opposite ends of the folds 31 to the side panels 26, 27 and thence to bottom panel 29. Since correspondingly spaced folds are connected through the interconnected panels 25, 26, 27 and 29, substantially rigid ring-like structures are thus formed. In a similar manner wind loads striking side panel 27 are correspondingly reflected in shear in the top and bottom panels 25, 29 respectively.

In order to prevent rain, dust and weather from entering between the intersecting corners of the panel members, cover means 61 are provided as seen in FIGS. 3 and 4. For this purpose a suitable fabric 62 is shown overlapping the marginal edge portion of top panel 25 a distance as at $h$ and extends between the top and bottom folds 31, 33 to cover and overlap the truncated edges of the side panel member 27. Sandwiched between the fabric and the folds of the panels are a plurality of resilient pad elements 63. As the planar arm portions 63, 64 contiguous with folds 39, see FIG. 4, are flexed between their full line position to their phantom line position the fabric 62 is stretched. In the absence of the resilient pad means 63 and assuming the fabric were to be attached directly to the surface of the fold 29, upon so flexing the diaphragm, the bonding would break loose. The interposition of the pad elements 63 thus precludes separation of the fabric in the fold areas.

While there has been described what at present is considered to be the preferred embodiment of this invention it will be obvious to those skilled in the art that various changes and modifications may be made therein without departing from the invention and it is therefore aimed in the appended claims to cover all such changes and modifications as fall within the spirit of this invention.

What is claimed is:

1. In a bellows construction including, a first fan fold member having inner and outer folds, a second fan fold member having inner and outer folds, said first and second fan fold members being arranged so that the outer folds of said first fan fold member are disposed in aligned intersecting relationship with corresponding inner folds of said second fan fold member, hinge means interconnecting said first and said second fan fold members, said hinge means including first pin means axially aligned with an outer fold of said first fan fold member, mounting means for said first pin means connected to said first member and enabling rotation of said first pin means about its axis, second pin means axially aligned with a corresponding inner fold of said second fan fold member, mounting means for said second pin means connected to said second member and enabling rotation of said second pin means about its axis, and pivot means interconnecting said first and said second pin means.

2. In the bellows construction as set forth in claim 1 wherein said first and said second fan fold members are of sheet metal.

3. In the bellows construction as set forth in claim 1 wherein said means for mounting said first and said second posts include hinge ear means having a first portion encircling said post means and second portions affixed to the planar portions of the metal adjacent the outer fold line.

4. In the bellows construction as set forth in claim 1 and including fabric means connected to marginal edge portions of said first and second fan fold members adjacent said hinge means.

5. In the bellows construction as set forth in claim 3 and including resilient pad means affixed to portions of said exterior surfaces of said inner and outer folds of said first and said second members, and wherein said fabric overlies and is secured to said resilient pad means.

6. In the bellows construction as set forth in claim 1 wherein said second fan fold member includes a truncated end portion such that its inner folds are of greater length than its outer folds, and wherein the ends of said inner folds terminate opposite the outer folds of said first member.

References Cited

UNITED STATES PATENTS

| | | | |
|---|---|---|---|
| 702,464 | 6/1902 | Niss | 95—11 |
| 745,022 | 11/1903 | Loftus | 296—105 |
| 1,863,957 | 6/1932 | Woolcott | 296—105 |
| 2,139,579 | 12/1938 | Dier | 2—85 |
| 2,470,337 | 5/1949 | Campbell | 304—1 |
| 2,516,347 | 7/1950 | Schwartz | 84—376 X |
| 2,752,172 | 6/1956 | Ziebold | 29—454 X |
| 2,778,674 | 1/1957 | Attendu | 296—28 |

NILE C. BYERS, JR., Primary Examiner

U.S. Cl. X.R.

135—5; 296—105